United States Patent
Kim et al.

(10) Patent No.: US 10,270,262 B2
(45) Date of Patent: Apr. 23, 2019

(54) BATTERY CONTROL METHOD AND APPARATUS, AND BATTERY PACK

(71) Applicant: Samsung Electronics Co., Ltd., Suwon-si (KR)

(72) Inventors: YoungJae Kim, Seoul (KR); Taejung Yeo, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 43 days.

(21) Appl. No.: 15/385,360

(22) Filed: Dec. 20, 2016

(65) Prior Publication Data

US 2017/0179736 A1 Jun. 22, 2017

(30) Foreign Application Priority Data

Dec. 21, 2015 (KR) .................. 10-2015-0182752

(51) Int. Cl.
*H02J 1/10* (2006.01)
*H02J 7/00* (2006.01)

(52) U.S. Cl.
CPC .......... *H02J 7/0019* (2013.01); *H02J 7/0014* (2013.01); *H02J 7/0026* (2013.01); *H02J 7/0045* (2013.01); *H02J 1/10* (2013.01)

(58) Field of Classification Search
CPC ...... H02J 7/0019; H02J 7/0014; H02J 7/0026; H02J 7/0045
USPC ........................................................ 320/134
See application file for complete search history.

(56) References Cited

U.S. PATENT DOCUMENTS

| | | | | |
|---|---|---|---|---|
| 7,710,120 B2* | 5/2010 | Yudahira | .......... | G01R 19/16542 320/104 |
| 9,041,249 B2* | 5/2015 | Chan | ......................... | H02J 1/00 307/43 |
| 9,758,053 B2* | 9/2017 | Kim | .................... | B60L 11/1866 |
| 2004/0135544 A1 | 7/2004 | King et al. | | |
| 2004/0201731 A1* | 10/2004 | Kakinuma | ............. | H04N 5/235 348/229.1 |
| 2004/0223768 A1* | 11/2004 | Shastri | .................. | G02F 1/0121 398/183 |
| 2010/0085009 A1* | 4/2010 | Kang | .................... | H02J 7/0016 320/118 |
| 2012/0293129 A1 | 11/2012 | Naghshtabrizi et al. | | |

(Continued)

FOREIGN PATENT DOCUMENTS

JP 2001-157366 A 6/2001
JP 2011-530697 A 12/2011
(Continued)

OTHER PUBLICATIONS

Extended European Search Report dated May 8, 2017, in counterpart European Application No. 16204678.3 (10 pages, in English).

*Primary Examiner* — M Baye Diao
(74) *Attorney, Agent, or Firm* — NSIP Law

(57) ABSTRACT

A battery control apparatus includes: a controller configured to control a switch network to control a connection between a converter and a first battery included in a battery group, among batteries, based on switching time information set to correspond to the first battery, wherein the switching time information is set based on a ratio between first state difference information of the first battery and second state difference information that is calculated based on first state difference information items of the batteries.

24 Claims, 14 Drawing Sheets

(56) References Cited

U.S. PATENT DOCUMENTS

| | | | |
|---|---|---|---|
| 2013/0020997 A1 | 1/2013 | Iwasawa et al. | |
| 2013/0099746 A1 | 4/2013 | Nork et al. | |
| 2014/0042974 A1* | 2/2014 | Yang | H01M 10/441 320/119 |
| 2014/0125284 A1 | 5/2014 | Qahouq | |
| 2015/0311736 A1* | 10/2015 | Park | H02J 7/0054 320/104 |
| 2016/0061901 A1* | 3/2016 | Kudo | G01R 31/362 324/426 |
| 2016/0311328 A1 | 10/2016 | Kim et al. | |
| 2017/0142339 A1* | 5/2017 | Kim | H04N 5/23241 |

FOREIGN PATENT DOCUMENTS

| | | |
|---|---|---|
| JP | 2013-507628 A | 3/2013 |
| KR | 10-2010-0119467 A | 11/2010 |
| KR | 10-2011-0076534 A | 7/2011 |
| KR | 10-2011-0084751 A | 7/2011 |
| KR | 10-1402802 B1 | 6/2014 |
| KR | 10-2016-0043838 A | 4/2016 |
| KR | 10-2016-0047933 A | 5/2016 |

\* cited by examiner $$P_{Target\_n} = P_{Average} + P_{Average} * \varepsilon_n$$

BATTERY CONTROL METHOD AND APPARATUS, AND BATTERY PACK

CROSS-REFERENCE TO RELATED APPLICATIONS

This application claims the benefit under 35 USC 119(a) of Korean Patent Application No. 10-2015-0182752, filed on Dec. 21, 2015, in the Korean Intellectual Property Office, the entire disclosure of which is incorporated herein by reference for all purposes.

BACKGROUND

1. Field

The following description relates to a battery control.

2. Description of Related Art

When a charging and discharging is repetitively performed on cells included in a battery, chemical differences or aging differences may be generated in the cells. Due to the chemical differences or the aging differences, voltage deviations or a capacity deviations may be generated in the cells. Accordingly, a cell may be over-charged or over-discharged. As a result, a capacity of the battery may be reduced and a life of the battery may also be reduced due to a degradation of the battery.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a battery control apparatus includes: a controller configured to control a switch network to control a connection between a converter and a first battery included in a battery group, among batteries, based on switching time information set to correspond to the first battery, wherein the switching time information is set based on a ratio between first state difference information of the first battery and second state difference information that is calculated based on first state difference information items of the batteries.

The first state difference information of the first battery may include a difference value between state information of the first battery and average state information of the batteries. Each of the first state difference information items of the batteries may include, for a respective battery among the batteries, a difference value between state information of the respective battery and the average state information of the batteries.

The switching time information may be set based on the ratio and a time interval corresponding to the battery group.

The controller may be configured to control the converter to output, during a period of time corresponding to the switching time information, a physical quantity corresponding to an output value defined based on the ratio.

The output value may be defined based on the ratio and an average output physical quantity of the battery group.

The controller may include a switch driver configured to transfer a switching signal generated based on the switching time information to the switch network.

The controller may be configured to control the switch network to control a connection between the converter and a second battery included in the battery group, based on second switching time information set to correspond to the second battery. The switch network may be configured to selectively connect the first battery and the second battery to the converter under a control of the controller.

The first battery and the second battery may be configured to be non-simultaneously connected to the converter.

The controller may be configured to control the converter to output, in a preset sequence, a physical quantity corresponding to an output value defined based on the ratio and a physical quantity corresponding to a second output value defined based on a second ratio. The second ratio may be a ratio between first state difference information of the second battery and the second state difference information.

In another general aspect, a battery pack includes: a battery group among batteries; a first battery control apparatus configured to determine a ratio between first state difference information of a first battery included in the battery group and second state difference information that is calculated based on first state difference information items of the batteries, and set switching time information of the first battery based on the ratio; and a second battery control apparatus configured to control a connection between the first battery and a converter based on the switching time information.

The first state difference information of the first battery may include a difference value between state information of the first battery and average state information of the batteries. Each of the first state difference information items of the batteries may include, for a respective battery among the batteries, a difference value between state information of the respective battery and the average state information of the batteries.

The first battery control apparatus may be configured to set the switching time information based on the ratio and a time interval corresponding to the battery group.

The second battery control apparatus may be configured to control the converter to output, during a period of time corresponding to the switching time information, a physical quantity corresponding to an output value defined based on the ratio.

The output value may be defined based on the ratio and an average output physical quantity of the battery group.

The second battery control apparatus may include: a switch network including a switch configured to connect the first battery to the converter; and a switch driver configured to transfer a switching signal generated based on the switching time information to the switch network.

The second battery control apparatus may be configured to control the switch network to control a connection between the converter and a second battery included in the battery group based on second switching time information set to correspond to the second battery. The switch network may be configured to selectively connect the first battery and the second battery to the converter under a control of the second battery control apparatus.

The first battery and the second battery may be configured to be non-simultaneously connected to the converter.

The second battery control apparatus may be configured to control the converter to output, in a preset sequence, a physical quantity corresponding to an output value defined based on the ratio and a physical quantity corresponding to a second output value defined based on a second ratio. The second ratio may be a ratio between first state difference information of the second battery and the second state difference information.

In another general aspect, a battery control method includes: controlling a connection between a converter and a first battery included in a battery group, among batteries, based on switching time information set to correspond to the first battery, wherein the switching time information is set based on a ratio between first state difference information of the first battery and second state difference information that is calculated based on first state difference information items of the batteries.

The first state difference information of the first battery may include a difference value between state information of the first battery and average state information of the batteries. Each of the first state difference information items of the batteries may include, for a respective battery among the batteries, a difference value between state information of the respective battery and the average state information of the batteries.

The switching time information may be set based on the ratio and a time interval corresponding to the battery group.

The battery control method may further include: controlling the converter to cause the converter to output, during a period of time corresponding to the switching time information, a physical quantity corresponding to an output value defined based on the ratio.

The battery control method may further include: controlling a connection between the converter and a second battery included in the battery group based on second switching time information set to correspond to the second battery, wherein the first battery and the second battery are selectively connected to the converter.

In another general aspect, a battery control method includes: determining a ratio between first state difference information of each battery among batteries and second state difference information that is calculated based on first state difference information items of the batteries; setting switching time information corresponding to each battery based on the ratio; and controlling a connection between each battery and a converter corresponding to each battery based on the switching time information.

Other features and aspects will be apparent from the following detailed description, the drawings, and the claims.

Figure 1A:
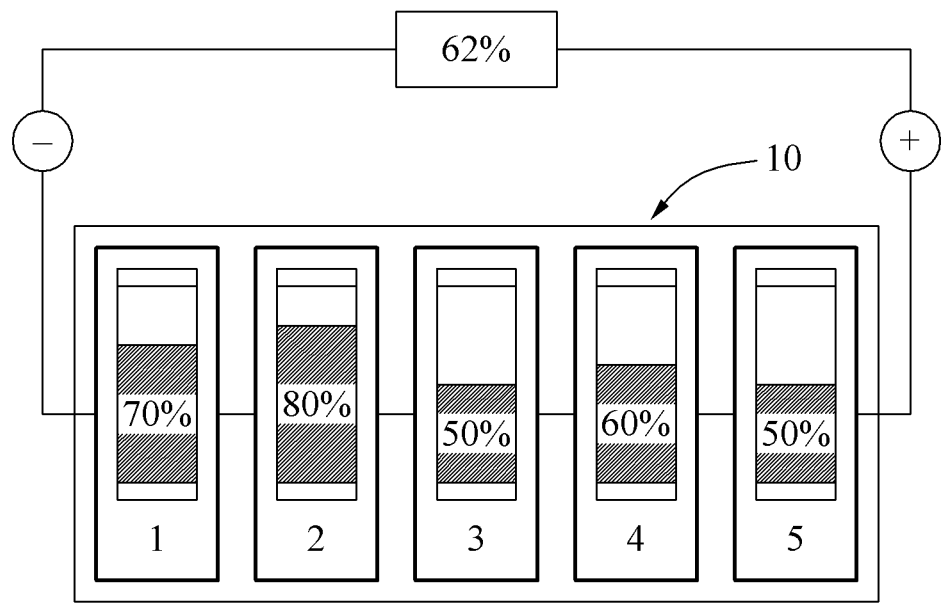
FIGS. 1A through 1C illustrate examples of an unbalance of a plurality of batteries.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

The terminology used herein is for the purpose of describing particular examples only and is not to be limiting of the examples. As used herein, the singular forms "a", "an", and "the" are intended to include the plural forms as well, unless the context clearly indicates otherwise. It will be further understood that the terms "include/comprise" and/or "have" when used in this specification, specify the presence of stated features, integers, steps, operations, elements, components, and/or combinations thereof, but do not preclude the presence or addition of one or more other features, numbers, steps, operations, elements, components, and/or groups thereof.

Figure 1B:
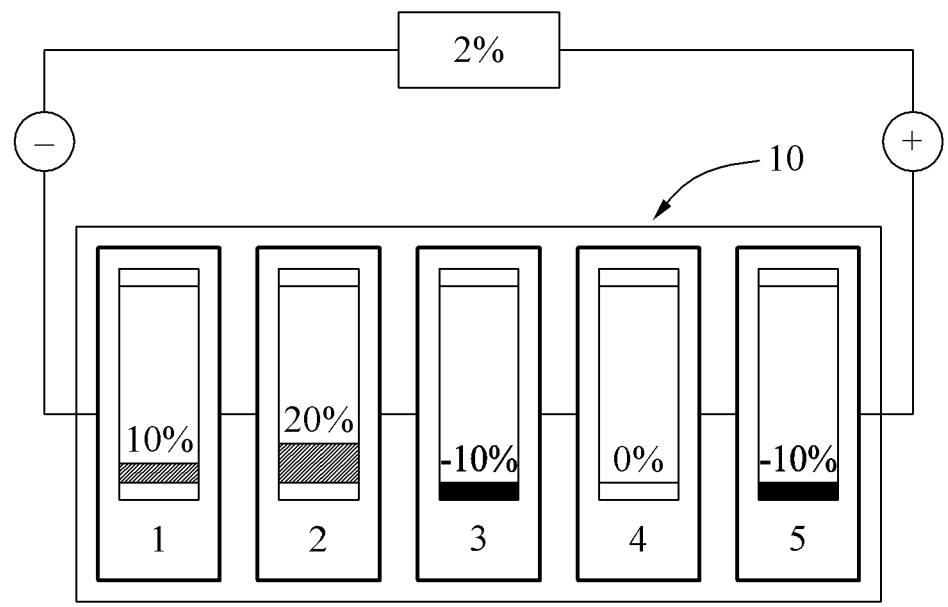
Figure 1C:
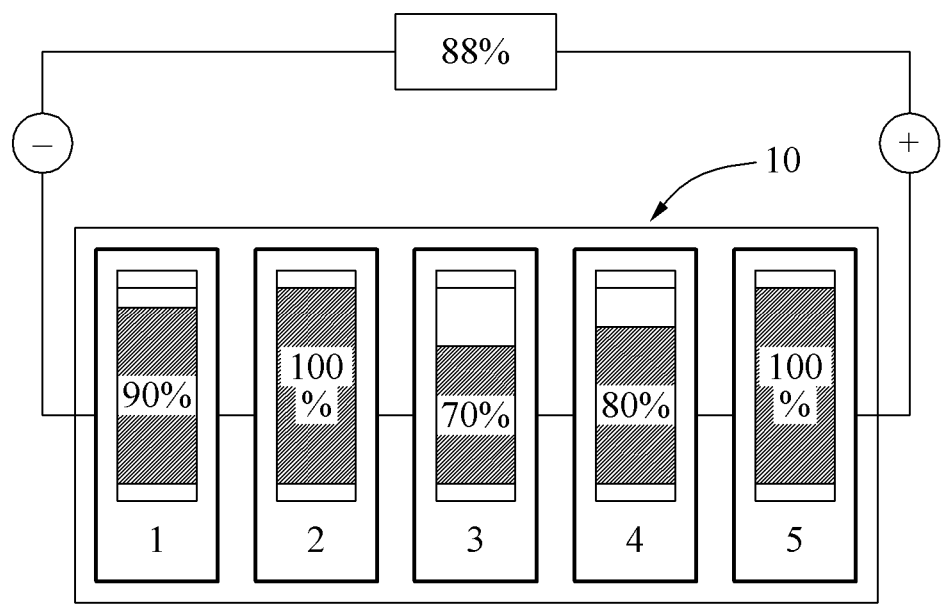

FIGS. 1A through 1C illustrate examples of an unbalance of a plurality of batteries 10 including batteries 1 through 5. That is, in FIGS. 1A through 10, the state information of the batteries 1 through 5 is unbalanced or un-equalized. The batteries 1 through 5 each include a battery cell or a battery module. The state information includes, for example, at least one of a state of charge (SOC), a capacity, and a state of health (SOH). With respect to the examples of FIGS. 1A through 10, the illustrated percentages are described herein as representing SOCs of respective batteries 1 through 5. However, in other examples the illustrated percentages may represent other state information.

For example, each of the batteries 1 through 5 has a different temperature based on a position of each of the batteries. For this reason, the state information of the plurality of batteries 10 is unbalanced or un-equalized. In the example of FIG. 1A, SOCs of the battery 1 and the battery 2 are higher than SOCs of the battery 3, the battery 4, and the battery 5.

When the plurality of batteries 10 is discharged in a state in which the state information of the plurality of batteries 10 is unbalanced, a portion of the plurality of batteries 10 (e.g., one or more of the batteries 1 through 5) may be overcharged. As illustrated in FIG. 1B, the battery 3 and the battery 5 are discharged. In this example, the battery 3 and the battery 5 are deteriorated.

Figure 10:
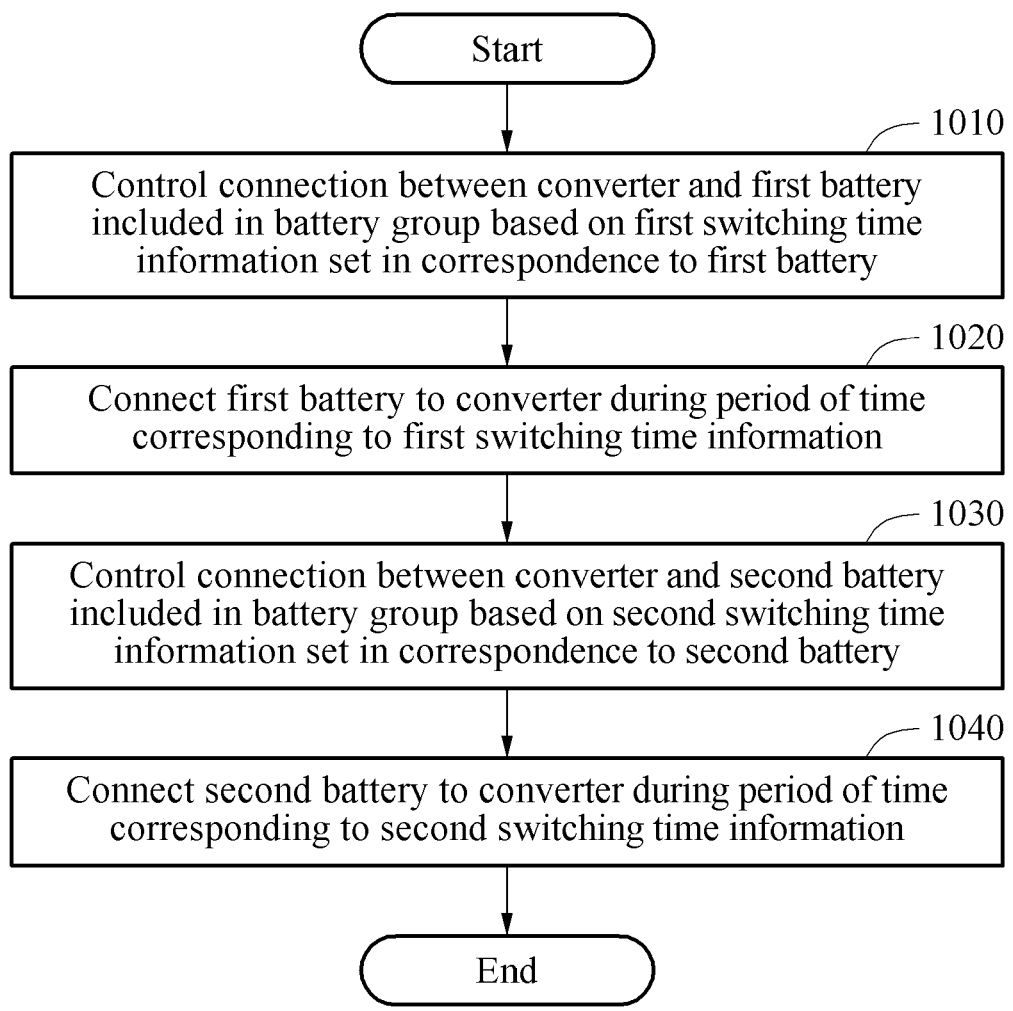
FIG. 10 illustrates another example of a battery control method performed by a battery control apparatus.

When the plurality of batteries 10 is charged in a state in which the state information of the plurality of batteries 10 is unbalanced, a portion of the plurality of batteries 10 may be fully charged and the other portion of the plurality of batteries 10 may be partially charged. As illustrated in FIG. 10, the battery 2 and the battery 5 are fully charged and the battery 1, the battery 3, and the battery 4 are partially charged. The batteries 1, 3 and 4 being partially charged may lead to a decrease in a utilization rate of the plurality of batteries 10.

When a charging and discharging cycle of the plurality of batteries 10 is iterated in a state in which the state information of the plurality of batteries 10 is unbalanced, a radical degradation in life performance may occur and in the plurality of batteries 10 and energy utilization of the batteries 1 through 5 may decrease.

Figure 2:
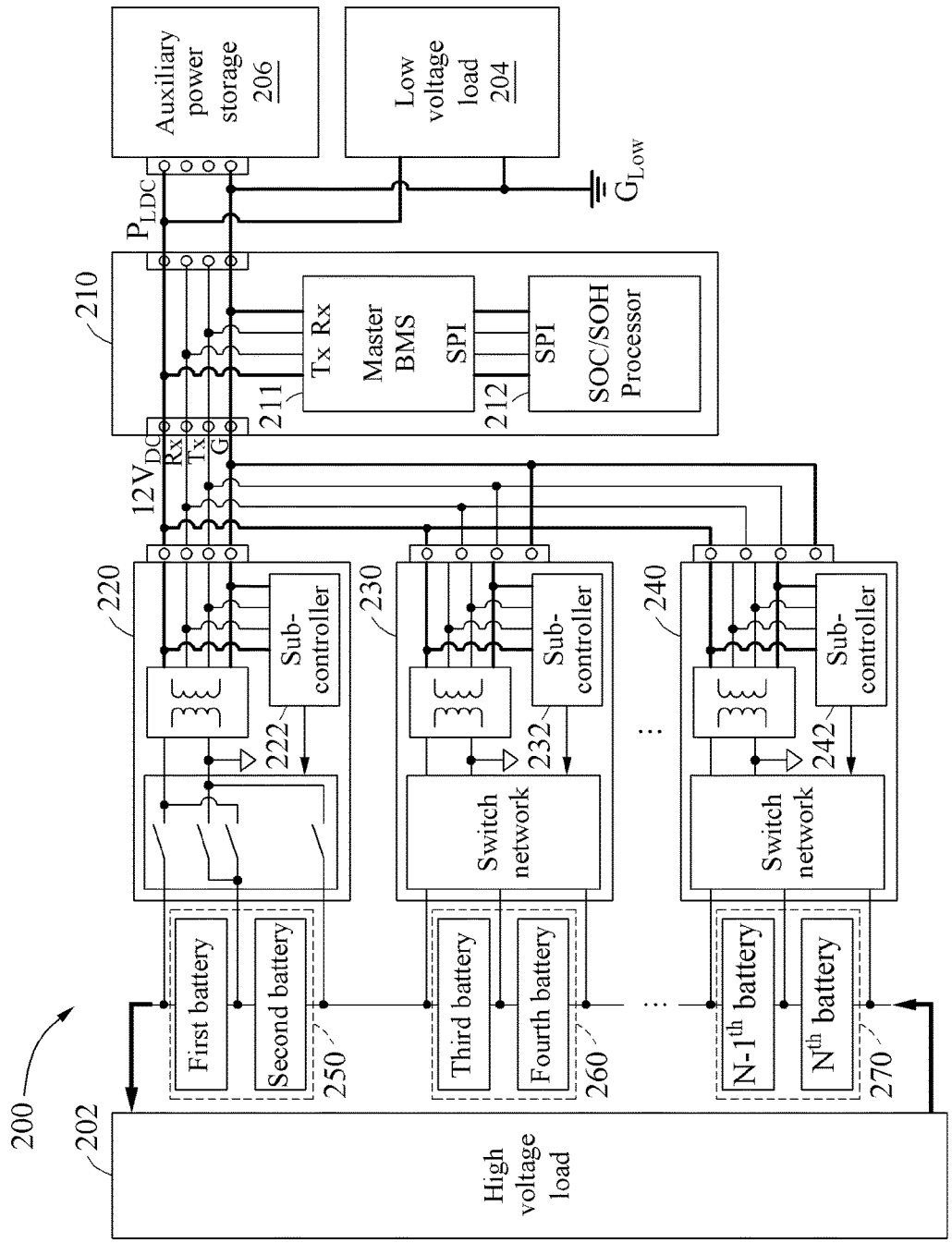
FIG. 2 illustrates an example of a battery pack.

FIG. 2 illustrates an example of a battery pack 200. Referring to FIG. 2, the battery pack 200 includes a main controller 210, a plurality of differential charge handlers (DCHs), for example, DCHs 220, 230, and 240, and battery groups, for example, battery groups 250, 260, and 270. Each of the battery groups 250, 260 and 270 includes a group of batteries from among a plurality of batteries including a first battery through an $N^{th}$ battery included in the battery pack 20.

The batteries are connected to one another in series. Each of the batteries is configured to supply power stored in each of the batteries to a high voltage load 202. Each of the batteries supplies the stored power to the high voltage load 202 without conversion. Each of the batteries performs a conversion, for example, a step-down operation, on the stored power and supplies power corresponding to a result of the conversion to a low voltage load 204 and/or an auxiliary power storage 206.

The main controller 210 includes a master battery management system (BMS) 211 and an SOC/SOH processor 212. The SOC/SOH processor 212 determines state information of the batteries. The master BMS 211 performs operations of the main controller 210 other than an operation of the SOC/SOH processor 212. The operations of SOC/SOH processor 212 and the operations of the master BMS 211 are described as an example and operations of SOC/SOH processor 212 and operations of the master BMS 211 are not limited to the described example.

For example, the SOC/SOH processor 212 and the master BMS 211 are devices physically separated from each other. Alternatively, based on an implementation, the SOC/SOH processor 212 and the master BMS 211 may be logically separated in a single physical device. Hereinafter, an example operation of the main controller 210 will be described.

The main controller 210 receives a physical quantity of each of the batteries from sub-controllers 222, 232 and 242 of the respective DCHs 220, 230 and 240. The physical quantity includes, for example, a voltage, a current, a temperature, an impedance, or a combination thereof. The main controller 210 determines state information of each of the batteries based on a physical quantity of each of the plurality of batteries. Also, the main controller 210 determines a value obtained by multiplying an SOC by an SOH for each of the batteries to be the state information of each of the plurality of batteries. As an example, the main controller 210 determines a value obtained by multiplying an SOC by an SOH of the first battery to be state information of the first battery. Similarly, the main controller 210 determines a value obtained by multiplying an SOC by an SOH of the second battery to be state information of the second battery.

Hereinafter, an example in which battery state information is an SOC will be described. However, the battery state information is not limited to be the SOC in the following descriptions. Thus, the following descriptions are also applicable to a case in which the battery information is, for example, a value obtained by multiplying the SOC by an SOH and a capacity.

The main controller 210 calculates average state information of the batteries. The main controller 210 calculates $SOC_{Average}$ using the SOC of each of the batteries as shown in Equation 1.

$$SOC_{Average}=(SOC_1+SOC_2+\ldots+SOC_N)/N \quad \text{[Equation 1]}$$

In Equation 1, N denotes a number of batteries in the plurality of batteries.

The main controller 210 calculates first state difference information of each of the batteries. The first state difference information indicates, for example, a difference value between state information of each of the batteries and the average state information. For example, the first state difference information of each of the batteries is expressed as shown in Equation 2.

$$\Delta SOC_n=SOC_n-SOC_{Average}, \quad \text{[Equation 2]}$$

In Equation 2, n indicates an identification number of a battery (e.g., an assigned number corresponding to one of the first through $N^{th}$ batteries).

The main controller 210 calculates second state difference information based on items of first state difference information. The second state difference information indicates, for example, a sum of absolute values of the items of first state difference information. For example, the second state difference information is expressed as shown in Equation 3.

$$\Sigma|\Delta SOC_n|=|\Delta SOC_1|+|\Delta SOC_2|+\ldots+|\Delta SOC_N| \quad \text{[Equation 3]}$$

The more unbalanced the state information of the plurality of batteries, the greater $|\Delta SOC_n|$. The more approximate the state information of the plurality of batteries to a balance state (e.g., equivalent state information among the batteries), the less $|\Delta SOC_n|$. Thus, the second state difference information is to be used as a reference for determining a balance state of the plurality of batteries.

The main controller 210 verifies whether the second state difference information satisfies a preset reference. For example, when the second state difference information is 0 or substantially equal to 0, the preset reference is satisfied. For example, when the second state difference information is greater than 0 or greater than a value substantially equal to 0, the preset reference is not satisfied. The descriptions related to whether the preset reference is satisfied is provided as an example and thus, an example of whether the preset reference is satisfied is not limited to the descriptions. Hereinafter, an operation of defining an output value in response to the second state difference information satisfying the preset reference will be described as an example.

When the second state difference information satisfies the preset reference, the main controller 210 defines the output value of each of the DCHs to be an average output physical quantity. For example, $P_{Target\_n}=P_{Average}$ or $I_{Target\_n}=I_{Average}$, wherein $P_{Target\_n}$ and $I_{Target\_n}$ are the output values of a DCH.

The average output physical quantity indicates, for example, an average value of physical quantities supplied by each of the DCHs to a low-voltage load and/or an auxiliary power storage during $Period_{group}$. Descriptions related to $Period_{group}$ will be provided later. As an example, the main controller 210 determines the average output physical quantity based on Equation 4.

$$P_{Average}=P_{DCH}/N \text{ or } I_{Average}=I_{DCH}/N \quad \text{[Equation 4]}$$

$$P_{Average}=P_{LDC}/N \text{ or } I_{Average}=I_{LDC}/N$$

The main controller 210 sets an output physical quantity, for example, $P_{DCH}$ or $I_{DCH}$ to be collectively output by the plurality of DCHs 220, 230, and 240, and determines an average value of the set output physical quantity to be the average output physical quantity. Also, the main controller 210 acquires information on a use current, $I_{LDC}$ or a use power, $P_{LDC}$ of the low-voltage load, and determines an average value of $P_{LDC}$ or $I_{LDC}$ to be the average output physical quantity.

The second state difference information satisfying the preset reference indicates that state information of a plurality of batteries is balanced and thus, the individual output values of the DCHs may not be defined to differ from one another. Hereinafter, an operation of defining an output value in response to the second state difference information dissatisfying the preset reference will be described as an example.

When the second state difference information does not satisfy the preset reference, the main controller 210 determines a ratio between the second state difference information and items of first state difference information. For example, the main controller 210 determines a ratio of each item of the first state difference information to the second state difference information. The main controller 210 determines the ratio based on Equation 5, for example.

$$\varepsilon_n = \Delta SOC_n / (\Sigma |\Delta SOC_n|) \qquad \text{[Equation 5]}$$

When $SOC_n$ is greater than $SOC_{Average}$, $\Delta SOC_n$ is a positive value and $\varepsilon_n$ is a positive value. When $SOC_n$ is less than $SOC_{Average}$, $\Delta SOC_n$ is a negative value and $\varepsilon_n$ is a negative value. $\varepsilon_n$ is a positive value or a negative value. $\varepsilon_n$ being a positive value indicates that a battery supplies a relatively large amount of power or current to a load. $\varepsilon_n$ being a negative value indicates that the battery supplies a relatively small amount of power or current to the load.

The main controller 210 defines an output value of each of the batteries based on the ratio. The battery control apparatus 200 defines the output value of each of the batteries based on the ratio and the average output physical quantity. As an example, the main controller 210 defines the output value of each of the batteries based on Equation 6.

$$P_{Target\_n} = P_{Average} + P_{Average} \times \varepsilon_n = V_{DCH} \times I_{Average} \times (1 + \varepsilon_n)$$
or $$I_{Target\_n} = I_{Average} + I_{Average} \times \varepsilon_n \qquad \text{[Equation 6]}$$

In Equation 6, $V_{DCH}$ denotes a voltage of both ends of a DCH.

As shown in Equation 6, the main controller 210 individually defines the output value of each of the batteries. The main controller 210 defines a different output value for each of the batteries. Also, the main controller 210 defines the output value of each of the batteries by adding a specific value to an average output physical quantity or subtracting the specific value from the average output physical quantity. The specific value is a value to which the ratio between the second state difference information and items of first state difference information is applied. In Equation 6, the specific value indicates $P_{Average} \times \varepsilon_n$ or $I_{Average} \times \varepsilon_n$.

The main controller 210 sets switching time information corresponding to each of the batteries based on the ratio. In FIG. 2, the main controller 210 sets switching time information of the first battery based on a time interval corresponding to a battery group 250 and a ratio determined to correspond to the first battery. Similarly, the main controller 210 sets switching time information of the second battery based on the time interval corresponding to the battery group 250 and a ratio determined to correspond to the second battery. The main controller 210 may set switching time information corresponding to each of the batteries based on Equation 7.

$$T_n = Period_{group}/m + \varepsilon_n \times Period_{group}/m - (m-1) \times T_{dead} \qquad \text{[Equation 7]}$$

In Equation 7, $Period_{group}$ is a time interval corresponding to a battery group. In an example, time intervals corresponding to the battery groups 250, 260, and 270 are the same as one another. In Equation 7, m denotes the number of batteries connected to each of the DCHs 220, 230, and 240. For example, m denotes the number of batteries included in a battery group. In the example of FIG. 2, m=2. In Equation 7, $T_{dead}$ denotes a predefined time in which batteries included in a battery group are non-simultaneously connected to a converter. $T_{dead}$ is a preset value based on a switching characteristic of a switch. For example, $T_{dead}$ is greater than 0 and less than or equal to 20 milliseconds (ms).

As shown in Equation 7, the main controller 210 individually sets switching time information corresponding to each of the batteries. Also, the main controller 210 differently sets the switching time information for each of the batteries.

The switching time information indicates a time in which each of the batteries is connected to the converter. For example, the switching time information indicates a connection time of the converter and each of the batteries in $Period_{group}$. In FIG. 2, a connection time of the first battery and a corresponding converter is $T_1$, and a connection time of the second battery and the corresponding converter is $T_2$. The switching time information and a connection between a battery and a converter based on the switching time information will be also described with reference to FIG. 3A.

The main controller 210 transmits the switching time information and the output value of each of the batteries to a DCH corresponding to each of the batteries. For example, the main controller 210 transmits the switching time information and the output value of the first battery and the second battery to the DCH 220, transmits the switching time information and the output value of the third battery and the fourth battery to the DCH 230, and transmits the switching time information and the output value of the N−1$^{th}$ battery and the N$^{th}$ battery to the DCH 240.

Hereinafter, an operation of a DCH will be described with reference to FIG. 3A through 3C.

Figure 3A:
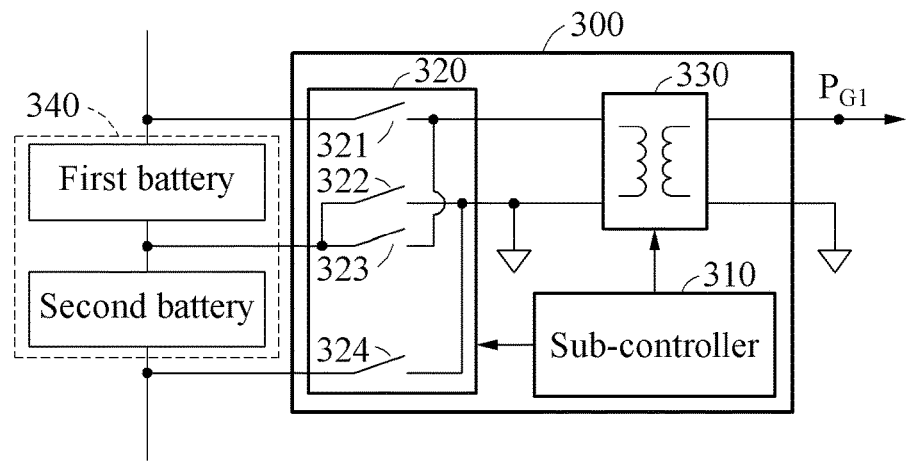
FIGS. 3A through 3C illustrate examples of a differential charge handler (DCH).

FIG. 3A illustrates an example of a DCH 300. Referring to FIG. 3A, the DCH 300 includes a sub-controller 310, a switch network 320, and a converter 330.

The DCH 300 receives switching time information set to correspond to a battery included in a battery group 340 and an output value defined to correspond to the battery from a main controller (e.g., the main controller 210 in the embodiment of FIG. 2). As an example, the DCH 300 receives a connection time $T_1$ and an output value $P_{Target\_1}$ corresponding to a first battery, and a connection time $T_2$ and an output $P_{Target\_2}$ corresponding to a second battery from the main controller. Here, it is assumed that an SOC of the first battery is greater than $SOC_{average}$ and an SOC of the second battery is less than $SOC_{average}$. In this example, $T_1 > T_2$, and $P_{Target\_1} > P_{Target\_2}$. The following description will be provided based on an example in which $T_1 > T_2$ and $P_{Target\_1} > P_{Target\_2}$.

The sub-controller 310 controls a connection between the converter 330 and a battery included in the battery group 340 based on the switching time information. The sub-controller 310 generates a control signal, for example, a switching signal based on $T_1$ and transmits the control signal to the switch network 320. Through the generation of the control signal, a switch 321 and a switch 323 are switched on, and the first battery is connected to the converter 330 during $T_1$. A switch 322 and a switch 324 are switched off, and the second battery is disconnected from the converter 330 during $T_1$.

The sub-controller 310 controls the converter 330 such that a physical quantity corresponding to an output value is output while the first battery is connected to the converter 330. As an example, the first battery outputs first power to the switch network 320 during $T_1$ such that the first power is transmitted to the converter 330 through the switch network 320. The converter 330 converts the first power to correspond to $P_{Target\_1}$. The DCH 300 supplies $P_{Target\_1}$ to a low voltage load and/or an auxiliary power storage during $T_1$.

When $T_1$ elapses, the switch 321 and the switch 323 are switched off and thus, the first battery is disconnected from the converter 330. When $T_1$ elapses, $T_{dead}$ starts. As the foregoing, the batteries included in the battery group 340 is non-simultaneously connected to the converter 330 during $T_{dead}$. Thus, the first battery and the second battery are non-simultaneously connected to the converter 330.

When $T_{dead}$ elapses, the sub-controller 310 generates a control signal, for example, a switching signal, based on $T_2$ and transfers the control signal to the switch network 320. Through this, the switch 322 and the switch 324 are switched on, and the second battery is connected to the converter 330 during $T_2$. The switch 321 and the switch 323 are switched off and thus, the first battery is disconnected from the converter 330 during $T_2$. Under the assumption that $T_1 > T_2$, a period of time during which the second battery is connected to the converter 330 is shorter than a period of time during which the first battery is connected to the converter 330.

The sub-controller 310 controls the converter 330 such that a physical quantity corresponding to an output value is output while the second battery is connected to the converter 330. For example, the converter 330 converts second power output by the second battery to correspond to $P_{Target\_2}$. The DCH 300 supplies $P_{Target\_2}$ to a low voltage load and/or an auxiliary power storage during $T_2$.

The switch network 320 selectively connects the first battery and the second battery to the converter 330 under a control of the sub-controller 310. Based on a selective connection, the DCH 300 supplies $P_{G1}$ ($=P_{Target\_1}+P_{Target\_2}$) to the low voltage load and/or the auxiliary power storage during $T_1$ and $T_2$. $T_1$ and $T_2$ are set within $Period_{group}$ and thus, the DCH 300 supplies $P_{G1}$ to the low voltage load and/or the auxiliary power storage during $Period_{group}$.

The DCH 300 connects the first battery in which a relatively large amount of power is stored to the converter 330 during a period of time longer than a period of time during which the second battery is connected to the converter. Also, the DCH 300 allows the first battery to output a relatively large physical quantity while the first battery is connected to the converter 330. The DCH 300 connects the second battery in which a relatively small amount of power is stored to the converter 330 during a period of time shorter than a period of time during which the first battery is connected to the converter 330. Also, the DCH 300 allows the second battery to output a relatively small physical quantity while the second battery is connected to the converter 330. Through this, an SOC of the first battery and an SOC of the second battery may be balanced, or approximately balanced, over time.

Figure 3B:
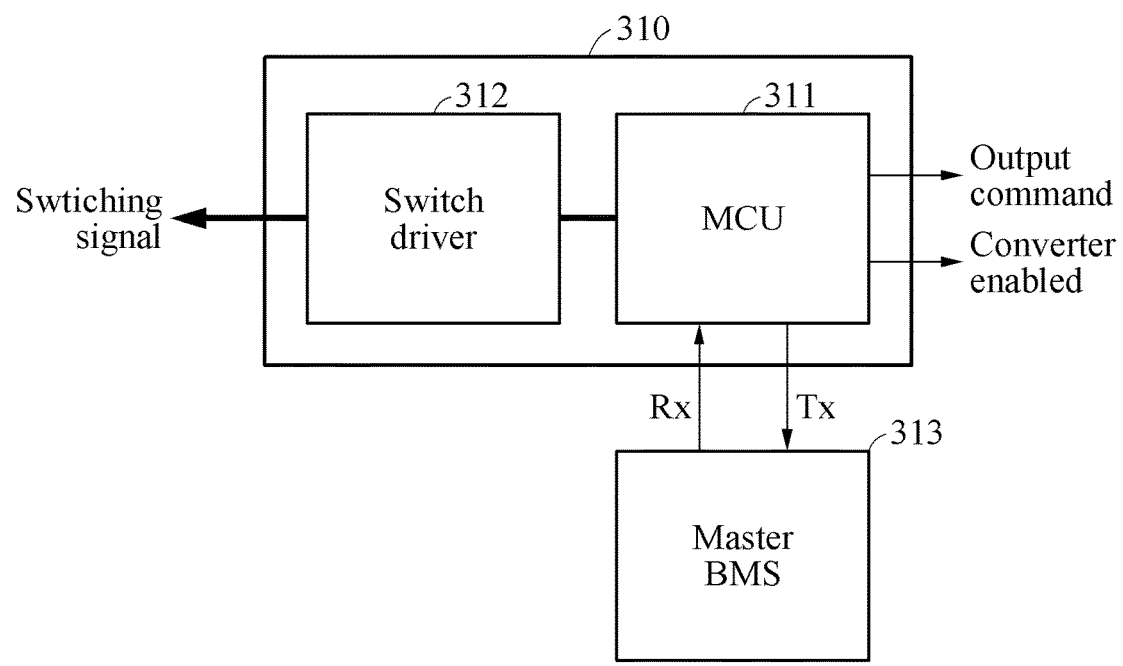

FIG. 3B illustrates an example of the sub-controller 310. The sub-controller 310 includes a micro controller unit (MCU) 311 and a switch driver 312.

The MCU 311 communicates with a master BMS 313. As an example, the MCU 311 transmits a battery physical quantity to the master BMS 313. Also, the MCU 311 receives switching time information and an output value from the master BMS 313.

The MCU 311 generates a control signal to control the converter 330. As illustrated in FIG. 3B, the MCU 311 generates an enabling signal for the converter 330 and transfers the enabling signal to the converter 330. Also, the MCU 311 generates an output command based on the output value and transfers the output command to the converter 330.

The MCU 311 transfers the switching time information to the switch driver 312. The switch driver 312 generates a switching signal based on the switching time information and transfers the switching signal to the switching network 320. Through the generation of the switching signal, each of switches 321 through 324 may be switched on and/or switched off.

Figure 3C:
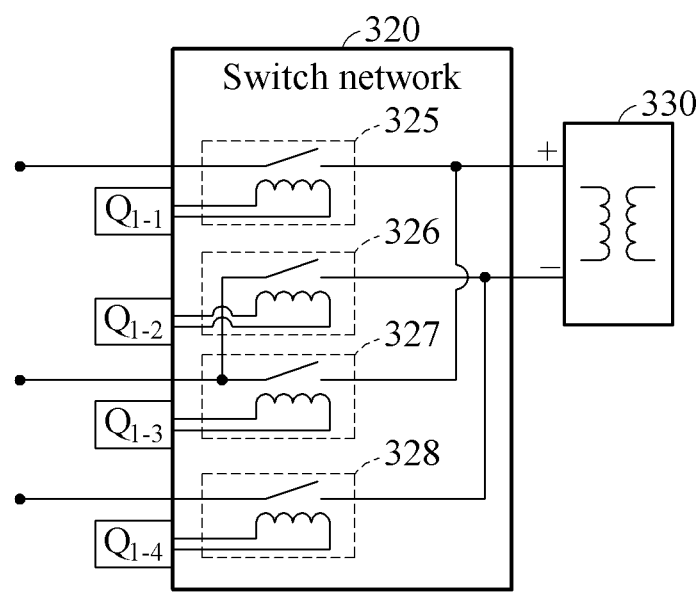

FIG. 3C illustrates an example of the switch network 320.

The switch network 320 includes a power switching element composed of power relays 325 through 328 and, although not shown in FIG. 3C transistors. The power relays 325 through 328 include respective coils $Q_{1-1}$, through $Q_{1-4}$. The transistors are, for example, metal-oxide-semiconductor field-effect transistors (MOSFETs). The aforementioned power switching element is merely an example and, thus, the switch network 320 may include other types of power switching elements.

Each of $Q_{1-1}$ through $Q_{1-4}$ of the switch network 320 receives the switching signal using the sub-controller 310. The switching signal generated based on $T_1$ is transferred to $Q_{1-1}$ and $Q_{1-3}$, and the power relay 325 and the power relay 327 are powered on. Through this operation, the first battery is connected to the converter 330. The switching signal generated based on $T_2$ is transferred to $Q_{1-2}$ and $Q_{1-4}$, and the power relay 326 and the power relay 328 are powered on. Through this operation, the second battery is connected to the converter 330.

Figure 4:
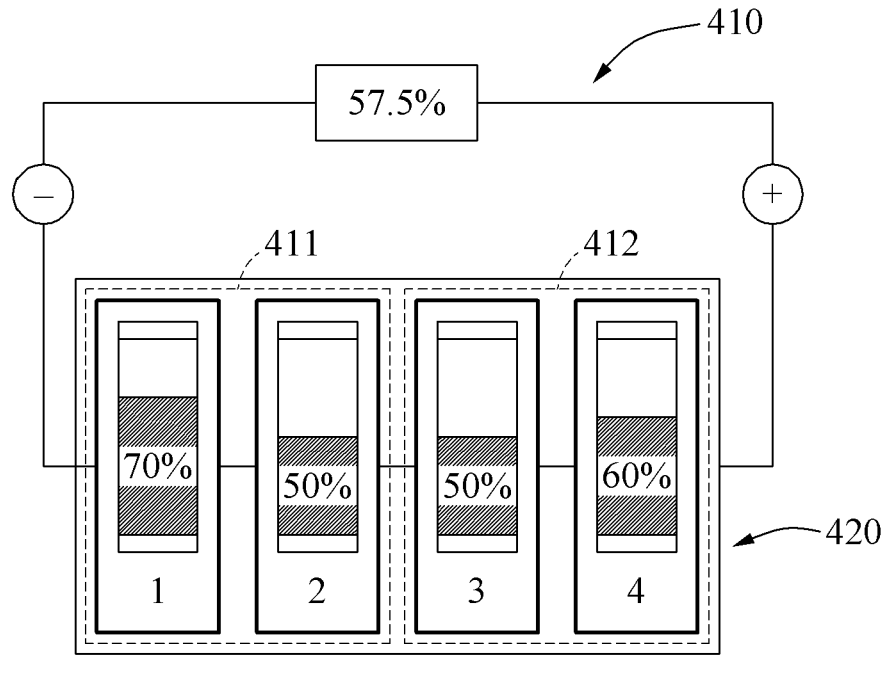
FIGS. 4 and 5 illustrate examples of an operation of a main controller and a DCH.
Figure 4:
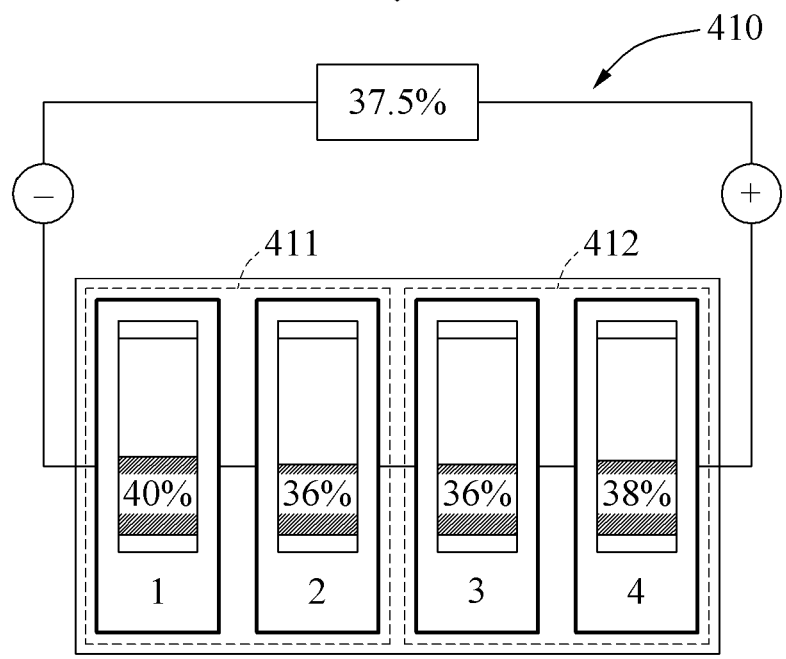
Figure 5:
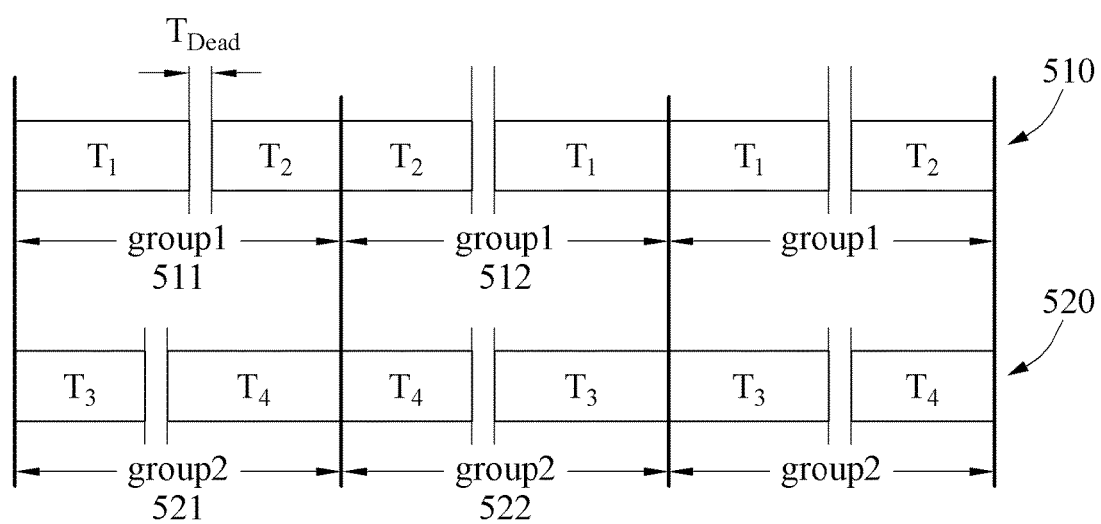

FIGS. 4 and 5 illustrates an example of operations of a main controller and a DCH.

In an upper part of FIG. 4, state information of a plurality of batteries 410 is unbalanced. In this example, an SOC of a first battery is 7, an SOC of a second battery is 5, an SOC of a third battery is 5, and an SOC of a fourth battery is 6. That is, according to an example, the SOCs of the first through fourth batteries correspond to one-tenth of the charge percentages of the respective batteries.

A main controller calculates $SOC_{Average}$. In FIG. 4, $SOC_{Average}=(7+5+5+6)/4=5.75$.

The main controller calculates $\Delta SOC_n$. In FIG. 4, $\Delta SOC_1=1.25$, $\Delta SOC_2=-0.75$, $\Delta SOC_3=-0.75$, and $\Delta SOC_4=0.25$. The main controller calculates $\Sigma|\Delta SOC_n|$. In FIG. 4, $\Sigma|\Delta SOC_n|=3.0$.

The main controller determines a ratio between $\Delta SOC_n$ and $\Sigma|\Delta SOC_n|$. In FIG. 4, the main controller determines that, for example, $\varepsilon_1=1.25/3.0=5/12$, $\varepsilon_2=-0.75/3.0=-0.25$, $\varepsilon_3=-0.75/3.0=-0.25$, and $\varepsilon_4=0.25/3.0=1/12$.

The main controller defines an output value corresponding to each of the plurality of batteries. In FIG. 4, when $P_{DCH}$ is set to be 8 W, the main controller defines the output value as follows:

$P_{Target\_1}=2+2\times 5/12=17/6$ W;

$P_{Target\_2}=2+2\times(-0.25)=1.5$ W;

$P_{Target\_3}=2+2\times(-0.25)=1.5$ W; and $P_{Target\_4}=2+2\times1/12=13/6$ W.

Here, $P_{Target\_1}$ and $P_{Target\_4}$ are greater than $P_{Average}$, and $P_{Target\_2}$ and $P_{Target\_3}$ are less than $P_{Average}$. The main controller adjusts $P_{Average}$ and defines an output value corresponding to each of the first battery and the fourth battery. In this example, the main controller defines the output value of the first battery and the fourth battery to be greater than $P_{Average}$ based on the ratio. Also, the main controller adjusts $P_{Average}$ and defines an output value of a DCH corresponding to each of the second battery and the third battery. In this example, the main controller defines the output value of the DCH corresponding to each of the second battery and the third battery to be less than $P_{Average}$ based on the ratio.

As an example, the battery control apparatus defines $P_{Target\_1}$ through $P_{Target\_4}$ based on information as shown in Table 1.

TABLE 1

|  | SOC | $SOC_{Average}$ | $\Delta SOC_n$ | $\Sigma|\Delta SOC_n|$ | $\varepsilon_n$ | $P_{Target\_n}$ |
|---|---|---|---|---|---|---|
| 1st battery | 7 | 5.75 | 1.25 | 3.0 | 5/12 | 17/6 |
| 2nd battery | 5 |  | −0.75 |  | −0.25 | 1.5 |
| 3rd battery | 5 |  | −0.75 |  | −0.25 | 1.5 |
| 4th battery | 6 |  | 0.25 |  | 1/12 | 13/6 |

The main controller sets switching timing information corresponding to each of the batteries. In FIG. 4, the main controller sets $T_1$ through $T_4$ to correspond to the first battery through the fourth battery, respectively. In FIG. 4, two batteries are included in each battery group 411 and 412 and thus, m=2. In FIG. 4, when a time interval corresponding to each of the battery groups 411 and 412 is 100 ms, and when $T_{dead}$=10 ms, the main controller sets $T_1$ through $T_a$ as follows:

$T_1=100/2+5/12\times100/2-10=365/6$ ms;

$T_2=100/2-0.25\times100/2-10=27.5$ ms;

$T_3=100/2-0.25\times100/2-10=27.5$ ms; and $T_4=100/2+1/12\times100/2-10=265/6$ ms.

In FIG. 4, $\varepsilon_1$ is greater than $\varepsilon_2$ and thus, $T_1$ is set to be longer than $T_2$ in $Period_{group1}$ 511. Also, $\varepsilon_4$ is greater than $\varepsilon_3$ and thus, $T_4$ is set to be longer than $T_3$ in $Period_{group2}$ 521.

The main controller transmits $P_{Target\_1}$ through $P_{Target\_4}$ and $T_1$ through $T_4$ to respective DCHs corresponding to the battery groups 411 and 412. A first DCH corresponding to the battery group 411 controls the battery group 411 based on $P_{Target\_1}$ and $P_{Target\_2}$, and $T_1$ and $T_2$. A second DCH corresponding to the battery group 412 controls the battery group based on $P_{Target\_3}$ and $P_{Target\_4}$, and $T_3$ and $T_4$. Hereinafter, an operation of each DCH will be described with reference to FIG. 5.

FIG. 5 illustrates items of switching time information 510 corresponding to the battery group 411 and items of switching time information 520 corresponding to the battery group 412. Referring to FIG. 5, the first DCH outputs power output by the first battery during $T_1$ by converting the power into $P_{Target\_1}$, and outputs power output by the second battery during $T_2$ by converting the power into $P_{Target\_2}$. Similarly, the second DCH outputs power output by the third battery by converting the power into $P_{Target\_3}$, and outputs power output by the fourth battery by converting the power into $P_{Target\_4}$.

$T_{dead}$ is a time between $T_1$ and $T_2$. Also, $T_{dead}$ is a time between $T_3$ and $T_4$. The foregoing descriptions related to $T_{dead}$ are also applicable here, repeated descriptions of $T_{dead}$ will be omitted.

$T_1$ through $T_4$ are within $Period_{group}$ and thus, a total amount of $P_{G1}$ output by the first DCH and $P_{G2}$ output by the second DCH during $Period_{group}$ is 8 watts (W). Since $P_{DCH}$ is set as 8 W, a total amount of power collectively output by the first DCH and the second DCH is the same as $P_{DCH}$. The main controller differently defines an output value output by each of the DCHs during a period of time corresponding to each of the items of switching time information and maintains a sum of output values of the DCHs. For example, the main controller individually defines $P_{Target\_1}$ output by the first DCH during $T_1$, $P_{Target\_2}$ output by the first DCH during $T_2$, $P_{Target\_3}$ output by the second DCH during $T_3$, and $P_{Target\_4}$ output by the second DCH during $T_4$ and maintains a sum of $P_{Target\_1}$ through $P_{Target\_4}$ to be the same. Through this operation, constant total power or current is supplied collectively from the DCHs to the low voltage load and/or the auxiliary power storage.

$T_1$ and $T_2$ are also set within $Period_{group1}$ 512 that is a subsequent time interval of $Period_{group1}$ 511. Switching time information is set for each of the batteries. When $T_1$ and $T_2$ are set again, as illustrated in FIG. 5, $Period_{group1}$ 512 starts in a state in which the converter is connected to the second battery. In contrast to $Period_{group1}$ 511, $T_2$ starts prior to $T_1$ within $Period_{group1}$ 512. When the first battery is set to be connected ahead of the second battery at a start of $Period_{group1}$ 512, a switch corresponding to the second battery needs to be switched off and a switch corresponding to the first battery needs to be switched on. In this example, a delay may occur due to the switching. To prevent an occurrence of the delay and achieve a continuity of power supply, the second battery and the converter are maintained in connection with each other. The first DCH corresponding to the battery group 411 preferentially outputs $P_{Target\_1}$ in $Period_{group1}$ 511, and preferentially outputs $P_{Target\_2}$ in $Period_{group1}$ 512. The first DCH outputs $P_{Target\_1}$ and $P_{Target\_2}$ in a preset order. Similarly, the second DCH corresponding to the battery group 412 outputs $P_{Target\_3}$ and $P_{Target\_4}$ in a preset sequence.

Differences among $T_1$ through $T_4$ decrease over time. The decrease in the differences indicates that state information of the plurality of batteries is approaching a balanced condition.

Referring back to FIG. 4, after some time has elapsed, state information of the plurality of batteries 410 is closer to the balance when compared to the previous state information of the plurality of batteries 410. Accordingly, energy utilization of the plurality of batteries may increase and an efficiency of the plurality of batteries may also increase.

In an example, in lieu of a main controller, a sub-controller included in a DCH defines an output value corresponding to a battery included in a corresponding battery group and sets switching time information corresponding to the battery. For example, a sub-controller included in the first DCH receives at least one item of information in Table 1 from the main controller, defines an output value corresponding to the first battery based on the received item(s) of information, and sets switching time information corresponding to the first battery.

Figure 6:
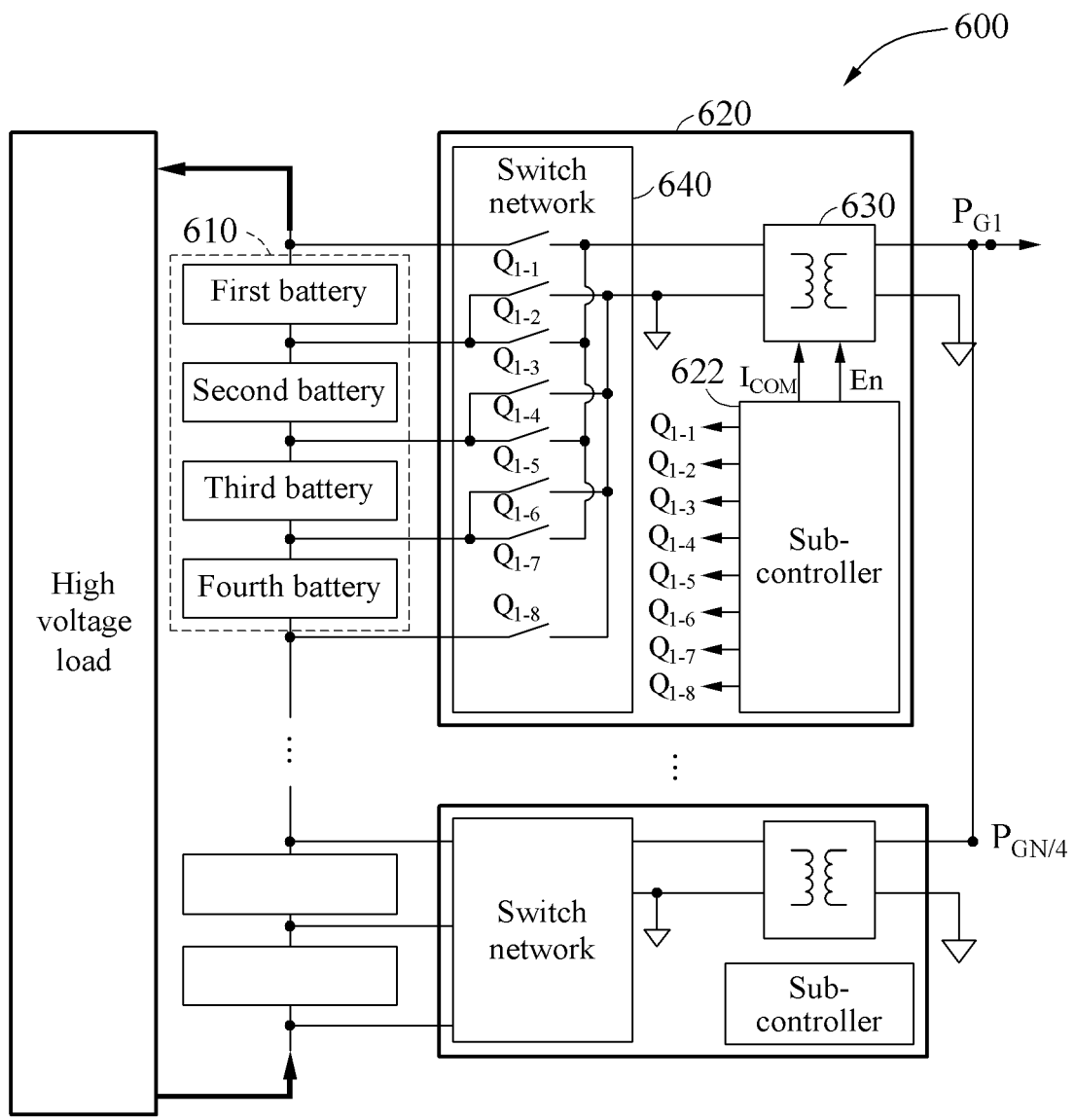
FIG. 6 illustrates another example of a battery pack.

FIG. 6 illustrates another example of a battery pack 600. Referring to FIG. 6, the battery pack 600 includes a battery group 610 including four batteries (first through fourth batteries) connected to a DCH 620. When the battery pack includes N batteries and four batteries are grouped into one battery group, the N batteries are grouped into N/4 battery groups. In this example, N/4 DCHs are included in the battery pack. The number of DCHs included in the battery pack is the same as the number of battery groups.

A sub-controller 622 controls a connection between a converter 630 of the DCH 620 and each of the batteries included in the battery group 610 based on a switching signal. Each of the batteries included in the battery group 610 is connected to the converter 630 in a preset time sequence. For example, a connection with the converter 630 is established in a time sequential order from the first battery.

A switch network 640 selectively connects the batteries included in the battery group 610 with the converter 630. The descriptions related to FIGS. 1 through 5 are also applicable to FIG. 6 and, thus, repeated descriptions with respect to FIG. 6 will be omitted.

Figure 7A:
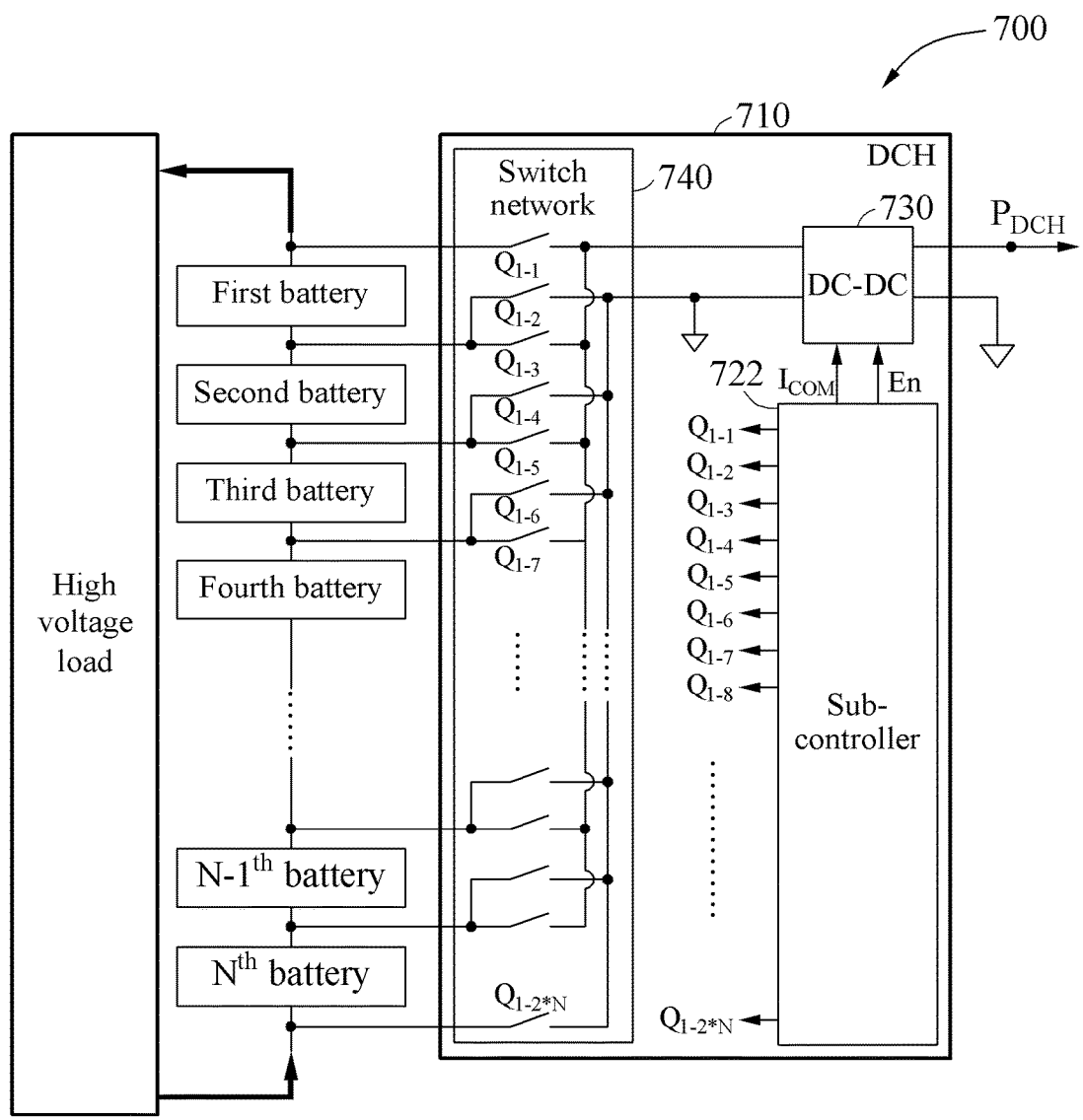
FIGS. 7A and 7B illustrate still another example of a battery pack.
Figure 7B:
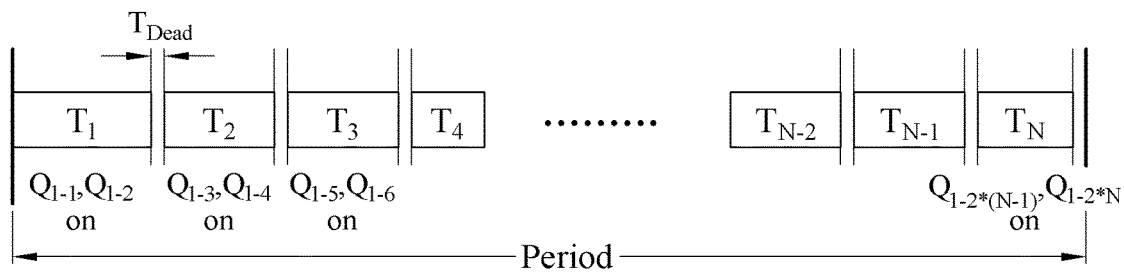

FIGS. 7A and 7B illustrate still another example of a battery pack 700. Referring to FIG. 7A, all batteries included in the battery pack 700 are connected to one DCH 710.

Referring to FIG. 7B, a first battery is connected to a converter 730 of the DCH 710 during $T_1$. Other batteries (the second through $N^{th}$ batteries) are disconnected from the converter during $T_1$. After $T_1$ and $T_{dead}$, a second battery is connected to the converter 730 during $T_2$. Similarly, the other batteries are disconnected from the converter 730 during $T_2$. After $T_2$ and $T_{dead}$, a third battery is connected to the converter 730 during $T_3$. In an example of FIG. 7A, the batteries are connected to the converter 730 in a time sequence.

The descriptions related to FIGS. 1 through 5 are also applicable to FIGS. 7A and 7B and, thus, repeated descriptions with respect to FIGS. 7A and 7B will be omitted.

Figure 8:
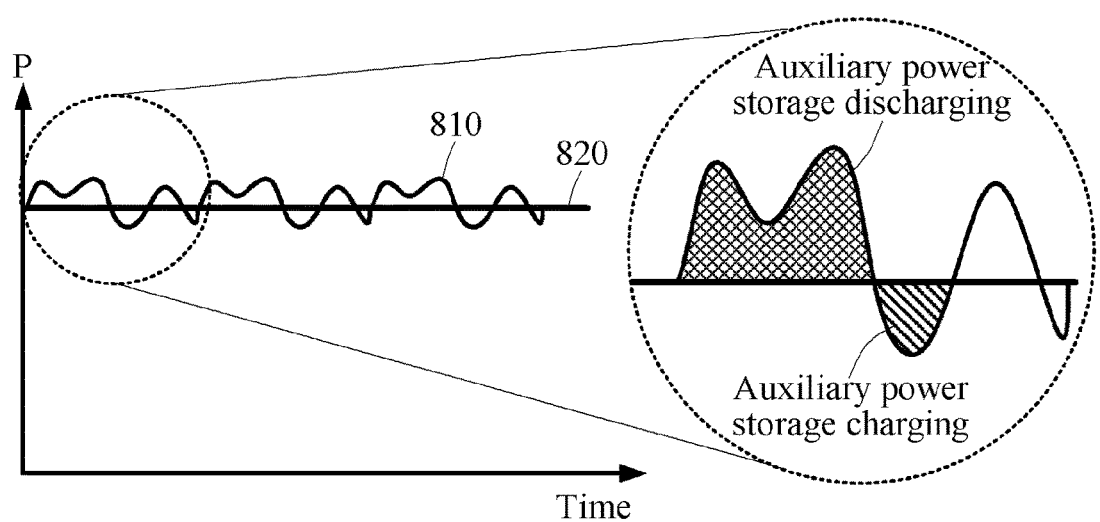
FIG. 8 illustrates an example of a supply of power by a battery pack.

FIG. 8 illustrates an example of a supply of power by a battery pack. More specifically, FIG. 8 illustrates a required power, $P_{LDC}$ 810, of a low-voltage load over time and a sum 820 of output values of DCHs. The $P_{LDC}$ 810 varies over time, and the sum 820 of the output values is maintained the same.

The low voltage load includes a system, such as a posture control system or a temperature control system in an electric moving body, operating at a low voltage, for example, 12 volts (V).

The DCHs output power to satisfy the $P_{LDC}$ 810. The output power denotes, for example, a total amount of power output by each of the DCHs during $Period_{group}$.

When the $P_{LDC}$ 810 of the low voltage load exceeds the sum 820 of the output values, an auxiliary power storage, for example, a $12V_{DC}$ auxiliary battery and the DCHs may supply power to the low voltage load. When the $P_{LDC}$ 810 is less than the sum 820 of the output values, a reserve power may be used to charge the auxiliary power storage.

Figure 9:
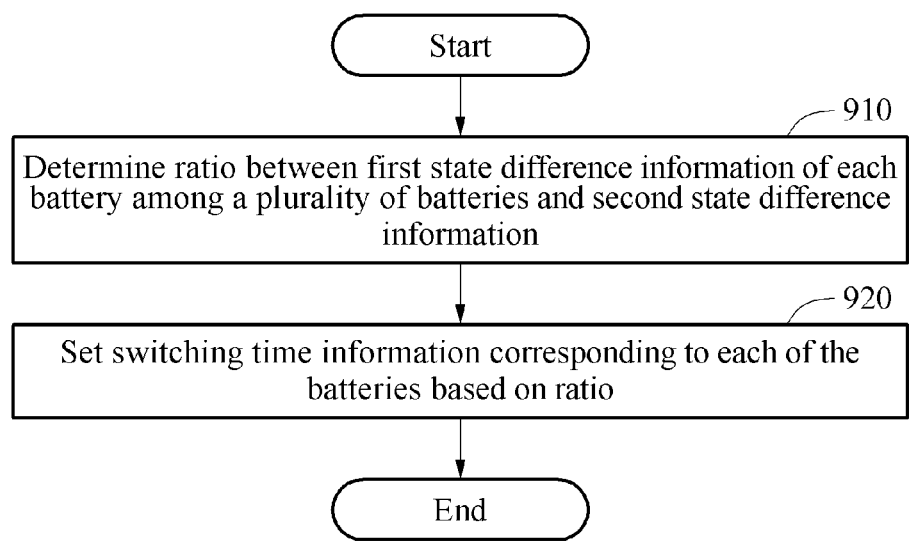
FIG. 9 illustrates an example of a battery control method performed by a battery control apparatus.

FIG. 9 is a flowchart illustrating an example of a battery control method performed by a battery control apparatus. The battery control apparatus may correspond to the main controller described in the foregoing examples.

In operation 910, the battery control apparatus determines a ratio between first state difference information of each battery among a plurality of batteries and second state difference information calculated based on items of first state difference information.

In operation 920, the first battery control apparatus sets switching time information corresponding to each of the batteries based on the ratio.

The descriptions related to FIGS. 1 through 8 are also applicable in this example and, thus, repeated descriptions with respect to FIG. 9 will be omitted.

FIG. 10 is a flowchart illustrating another example of a battery control method performed by a battery control apparatus. The battery control apparatus may correspond to the DCH described in the foregoing examples.

In operation 1010, the battery control apparatus controls a connection between a converter and a first battery included in a battery group based on first switching time information set in correspondence to the first battery.

In operation 1020, the battery control apparatus connects the first battery to a converter during a period of time corresponding to the first switching time information.

In operation 1030, the battery control apparatus controls a connection between the converter and a second battery included in the battery group based on second switching time information set in correspondence to the second battery.

In operation 1040, the battery control apparatus connects the second battery to the converter during a period of time corresponding to the second switching time information.

The descriptions related to FIGS. 1 through 9 are also applicable to this example and, thus, repeated descriptions with respect to FIG. 10 will be omitted.

Figure 11:
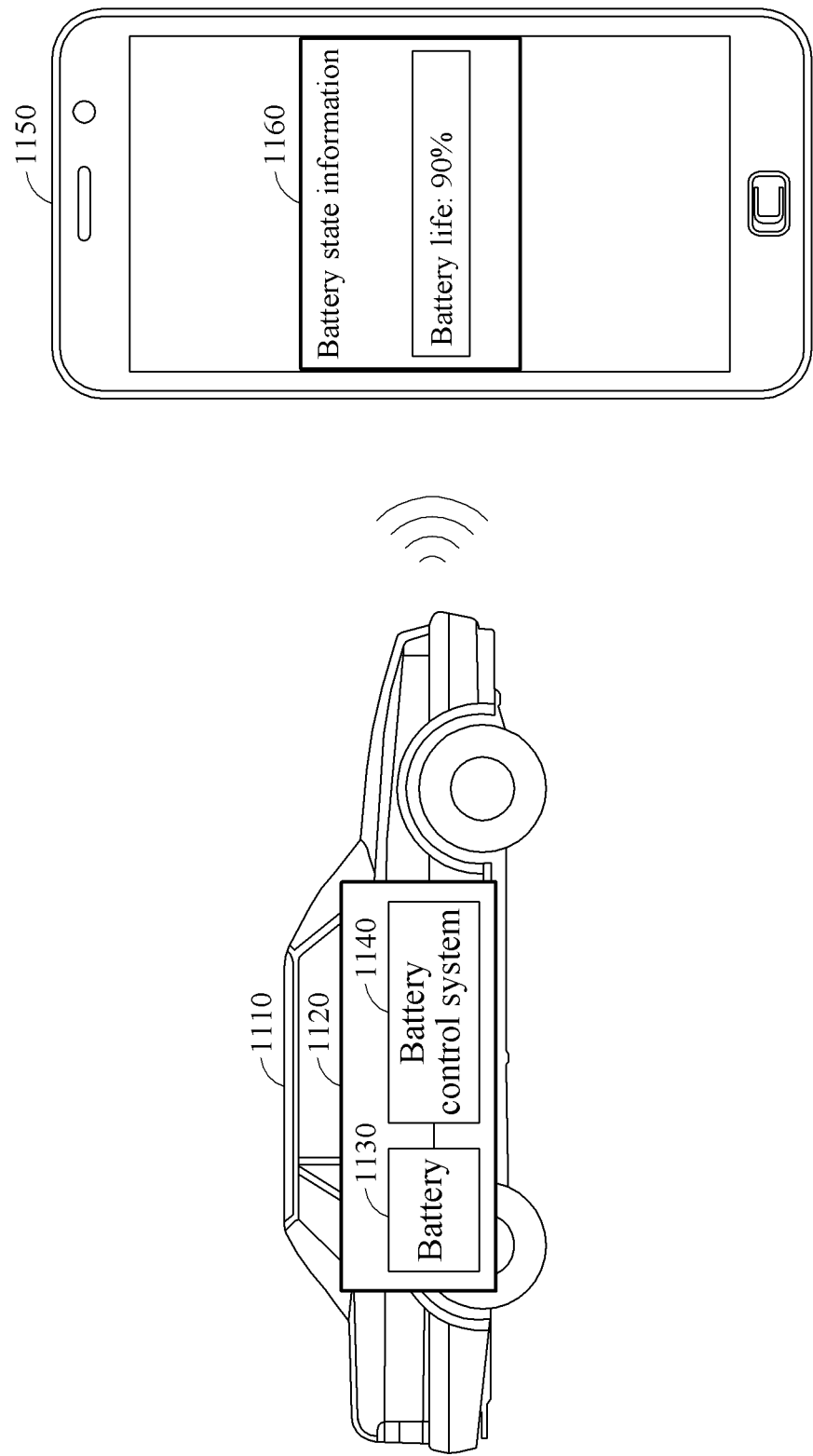
FIG. 11 illustrates an example of a user interface for providing battery state information.

FIG. 11 illustrates an example of a user interface for providing battery state information. Referring to FIG. 11, a physical application, for example, an electric moving body 1110, for example, an automobile or other vehicle, includes a battery system 1120. The aforementioned physical application is merely an example and thus, other types of physical applications are possible. A battery system may be applicable to an electric moving body and any type of physical application using a battery.

The battery system 1120 includes batteries including a battery 1130 and a battery control system 1140. The battery control system 1140 includes the main controller and at least one DCH described in the foregoing examples. The battery 1130 includes a battery module or a battery cell.

When a charging and discharging cycle of a battery pack having a performance deviation, for example, a voltage difference and/or a capacity difference, among the batteries is iterated, an over-charging and an over-discharging may occur. The over-charging and the over-discharging may cause degradation in the batteries, thereby reducing lives of the plurality of batteries.

The battery control system 1140 enables the plurality of batteries to operate in an optimal state based on information including, for example, a voltage, a current, and a temperature, of the batteries. As an example, the battery control system 1140 enables the batteries to operate at an optimal temperature or maintains state information of the batteries to correspond to an appropriate level. Also, the battery control system 1140 defines different switching time information and a different output value for each of the batteries so as to equalize the state information of the batteries.

The battery control system 1140 generates information for a safe operation of the battery system 1120 and transmits the information to a terminal. For example, the battery control system 1140 transmits life information, performance information, and/or a replacement time of the batteries to a terminal 1150, such as a mobile phone, tablet computer, PC or other device.

In an example, the battery control system 1140 receives a trigger signal from the terminal 1150 through a wireless interface, and determines state information, for example, life information, of the battery 1130 based on the trigger signal. The battery control system 1140 transmits the state information to the terminal 1150 through the wireless interface. The terminal 1150 displays the state information of the batteries using a user interface 1160.

A battery control apparatus is implemented in, for example, a form of a chip. Additionally, the battery control apparatus may be included in a high-capacity battery management system such as an energy storage system (ESS), an electric vehicle, or a hybrid vehicle. Also, the battery control apparatus may be included in a battery management system or an electronic device including a rechargeable battery.

The apparatuses, units, modules, devices, and other components illustrated in FIGS. 1A-4, 6, 7A and 11 (e.g., battery packs 200, 600 and 700, high voltage load 202, voltage load 204, auxiliary power storage 206, main controller 210, DCHs 220, 230, 240, 620, and 710, master BMSs 211 and 313, SOC/SOH processor 212, sub-controllers 222, 232, 242, 310, 622 and 722, battery groups 250, 260, 270 and 610, MCU 311, switch driver 312, switch networks 320 and 640, switches 321-328, converters 330, 630 and 730, battery system 1120, battery control system 1140 and terminal 1150) that perform the operations described herein with respect to FIGS. 1-11 are implemented by hardware components. Examples of hardware components include controllers, sensors, generators, drivers, memories, comparators, arithmetic logic units, adders, subtractors, multipliers, dividers, integrators, and any other electronic components known to one of ordinary skill in the art. In one example, the hardware components are implemented by computing hardware, for example, by one or more processors or computers. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein with respect to FIGS. 1-11. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 5 and 7B-10 that perform the operations described herein with respect to FIGS. 1-22 are performed by computing hardware, for example, by one or more processors or computers, as described above executing instructions or software to perform the operations described herein.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A battery control apparatus for implementing a balancing of batteries, comprising:
   a switch network configured to connect a first battery included in a battery group, of the batteries, to a converter or disconnect the first battery from the converter; and
   a controller configured to initiate a balancing of the battery group based on determined respective switching time information for each of the battery group, including a control of the switch network to control a time at which the first battery is connected to the converter, based on a determined switching time information set to correspond to the first battery,
   wherein the determined switching time information is set based on a ratio between first state difference information of the first battery and second state difference information that is determined based on first state difference information items of the batteries.

2. The battery control apparatus of claim 1, wherein:
   the first state difference information of the first battery comprises a difference value between state information of the first battery and average state information of the batteries; and
   each of the first state difference information items of the batteries comprises, for a respective battery among the batteries, a difference value between state information of the respective battery and the average state information of the batteries, wherein
   the state information of the respective battery is determined using a corresponding state-of-charge (SOC) and a corresponding state-of-health (SOH) of the respective battery.

3. The battery control apparatus of claim 1, wherein the determined switching time information is set based on the ratio and a time interval corresponding to the battery group.

4. The battery control apparatus of claim 3, wherein the controller is configured to control the converter to output, during a period of time corresponding to the determined switching time information, a physical quantity corresponding to an output value defined based on the ratio.

5. The battery control apparatus of claim 4, wherein the output value is defined based on the ratio and an average output physical quantity.

6. The battery control apparatus of claim 1, wherein the controller includes a switch driver configured to transfer a switching signal generated based on the switching time information to the switch network.

7. The battery control apparatus of claim 1, wherein:
   the controller is configured to control the switch network to control a connection between the converter and a second battery included in the battery group, based on a determined second switching time information set to correspond to the second battery; and
   the switch network is configured to selectively connect the first battery and the second battery to the converter, respectively during the determined first and second switching time information, under a control of the controller.

8. The battery control apparatus of claim 7, wherein the first battery and the second battery are configured to be non-simultaneously connected to the converter.

9. The battery control apparatus of claim 7, wherein:
   the controller is configured to control the converter to output, in a preset sequence, a physical quantity corresponding to an output value defined based on the ratio and a physical quantity corresponding to a second output value defined based on a second ratio; and
   the second ratio is a ratio between first state difference information of the second battery and the second state difference information.

10. A battery pack, comprising:
    a battery group among batteries;
    a first battery control apparatus configured to determine a ratio between first state difference information of a first battery included in the battery group and second state difference information that is determined based on first state difference information items of the batteries, and set switching time information of the first battery, the switching time information determined based on the ratio; and
    a second battery control apparatus configured to initiate a balancing of the battery group, including a control of a connection of the first battery to a converter and control a time at which the first battery is connected to the converter based on the switching time information.

11. The battery pack of claim 10, wherein:
    the first state difference information of the first battery comprises a difference value between state information of the first battery and average state information of the batteries; and
    each of the first state difference information items of the batteries comprises, for a respective battery among the batteries, a difference value between state information of the respective battery and the average state information of the batteries, wherein
    the state information of the respective battery is determined using a corresponding state-of-charge (SOC) and a corresponding state-of-health (SOH) of the respective battery.

12. The battery pack of claim 10, wherein the first battery control apparatus is configured to determine the switching time information, to be set for the first battery, based on the ratio and a time interval corresponding to the battery group.

13. The battery pack of claim 12, wherein the second battery control apparatus is configured to control the converter to output, during a period of time corresponding to the determined switching time information, a physical quantity corresponding to an output value defined based on the ratio.

14. The battery pack of claim 12, wherein the output value is defined based on the ratio and an average output physical quantity.

15. The battery pack of claim 10, wherein the second battery control apparatus comprises:
    a switch network comprising a switch configured to connect the first battery to the converter; and
    a switch driver configured to transfer a switching signal generated based on the switching time information to the switch network.

16. The battery pack of claim 15, wherein:
    the second battery control apparatus is configured to control the switch network to control a connection between the converter and a second battery included in the battery group based on a determined second switching time information set to correspond to the second battery; and
    the switch network is configured to selectively connect the first battery and the second battery to the converter, respectively during the determined first and second switching time information, under a control of the second battery control apparatus.

17. The battery pack of claim 16, wherein the first battery and the second battery are configured to be non-simultaneously connected to the converter.

18. The battery pack of claim 15, wherein the second battery control apparatus is configured to control the converter to output, in a preset sequence, a physical quantity corresponding to an output value defined based on the ratio and a physical quantity corresponding to a second output value defined based on a second ratio, and the second ratio is a ratio between first state difference information of the second battery and the second state difference information.

19. A battery control method, performed by one or more processors, for implementing a balancing of batteries, the method comprising:

initiate a balancing of a battery group, of the batteries, based on determined respective switching time information for each battery of the battery group, including controlling a connecting of a first battery included in the battery group to a converter at a connection time based on a determined switching time information set to correspond to the first battery, wherein the determined switching time information is set based on a ratio between first state difference information of the first battery and second state difference information that is determined based on first state difference information items of the batteries.

20. The method of claim 19, wherein:

the first state difference information of the first battery comprises a difference value between state information of the first battery and average state information of the batteries; and each of the first state difference information items of the batteries comprises, for a respective battery among the batteries, a difference value between state information of the respective battery and the average state information of the batteries, wherein the state information of the respective battery is determined using a corresponding state-of-charge (SOC) and a corresponding state-of-health (SOH) of the respective battery.

21. The battery control method of claim 19, wherein the determined switching time information is set based on the ratio and a time interval corresponding to the battery group.

22. The battery control method of claim 19, further comprising:

controlling the converter to cause the converter to output, during a period of time corresponding to the determined switching time information, a physical quantity corresponding to an output value defined based on the ratio.

23. The battery control method of claim 19, further comprising:

controlling, using plural switches, a connection between the converter and a second battery included in the battery group based on a determined second switching time information set to correspond to the second battery, wherein the first battery and the second battery are selectively connected to the converter.

24. A battery control method, performed by one or more processors, for implementing a balancing of batteries, the method comprising:

determining a ratio between first state difference information of each battery among batteries and second state difference information that is calculated based on first state difference information items of the batteries;

setting switching times corresponding to each battery, the switching times being determined based on the ratio; and initiating the balancing of the batteries, including controlling, using plural switches, respective connections between each battery and a converter corresponding to each battery based on the set switching times, wherein a time at which each battery is connected to the converter corresponding to each battery is controlled based on the controlling of the respective connections.

* * * * *